(12) United States Patent
Muthers

(10) Patent No.: US 10,907,989 B2
(45) Date of Patent: Feb. 2, 2021

(54) DEVICE AND A METHOD FOR PROCESSING A MEASUREMENT SIGNAL FROM A MAGNETIC FIELD SENSOR

(71) Applicant: TDK—Micronas GmbH, Freiburg (DE)

(72) Inventor: David Muthers, Denzlingen (DE)

(73) Assignee: TDK—Micronas GmbH, Freiburg (DE)

(*) Notice: Subject to any disclaimer, the term of this patent is extended or adjusted under 35 U.S.C. 154(b) by 78 days.

(21) Appl. No.: 16/195,896

(22) Filed: Nov. 20, 2018

(65) Prior Publication Data

US 2019/0162557 A1    May 30, 2019

(30) Foreign Application Priority Data

Nov. 24, 2017  (DE) .......................... 10 2017 127 837

(51) Int. Cl.
  *G01D 5/14*  (2006.01)
  *G01D 3/02*  (2006.01)

(52) U.S. Cl.
  CPC ............... *G01D 5/145* (2013.01); *G01D 3/02* (2013.01)

(58) Field of Classification Search
  None
  See application file for complete search history.

(56) References Cited

U.S. PATENT DOCUMENTS

| 2009/0219016 A1 | 9/2009 | Debrailly |
| 2014/0070796 A1* | 3/2014 | Reymond .............. G01D 5/145 324/207.2 |
| 2015/0137797 A1* | 5/2015 | Ausserlechner ......... G01D 3/08 324/207.2 |
| 2016/0146905 A1 | 5/2016 | Diaconu |
| 2017/0219665 A1 | 8/2017 | Alpago |

FOREIGN PATENT DOCUMENTS

| EP | 0 916 074 B1 | 7/2003 |
| EP | 2 149 797 B1 | 5/2012 |
| EP | 2 846 136 | 3/2015 |

OTHER PUBLICATIONS

S. Reymond, et.al.,"True 2D CMOS integrated Hall sensor", IEEE 2007 Conference.
M..Metz, et.al., "Contactless Angle Measurement Using Four Hall Devices on Single Chip", Transducers '97, 1997 Conference on Solid-State Sensors and Actuators, Chicago, Jun. 16-19, 1997.

* cited by examiner

*Primary Examiner* — Jas A Sanghera
(74) *Attorney, Agent, or Firm* — 24IP Law Group USA, PLLC; Timothy Dewitt

(57) ABSTRACT

A device and method for the processing of a measurement signal of a magnetic field $B(\varphi)$ is described. The device comprises a permanent magnet having two or four poles, an odd number of magnetic field sensors that are arranged in a plane below the magnets, and a signal processing unit, which is adapted to detect the values of the odd number of magnetic field sensors, to filter the fundamental frequency of the magnetic field out of the detected values of the lateral magnetic field sensors in order to calculate the value of the rotation angle from the fundamental frequency.

5 Claims, 5 Drawing Sheets

DEVICE AND A METHOD FOR PROCESSING A MEASUREMENT SIGNAL FROM A MAGNETIC FIELD SENSOR

CROSS-REFERENCE TO RELATED APPLICATIONS

This application claims benefit of and priority to German Patent Application DE 10 2017 127 837.0, filed on 24 Nov. 2017. The entire disclosure of German Patent Application DE 10 2017 127 837.0 is hereby incorporated by reference.

BACKGROUND OF THE INVENTION

Field of the Invention

The invention relates to a device and a method for processing a measurement signal from a magnetic field sensor.

Brief Description of the Related Art

The contactless measurement of a rotation angle using a measurement signal of a magnetic field sensor is known. For example, a device is known from the publication of Reymond, S. et al. "True 2-D CMOS Integrated Hall Sensor," IEEE SENSORS 2007 Conference, pages 860-863, for contactless measurement of a rotation angle, which device has a semiconductor substrate in which so-called vertical Hall sensors are integrated as magnetic field sensors 64. The magnetic field sensors in this publication are arranged at uniform distances from each other on a circular path situated within the chip plane of the semiconductor substrate. The vertical planes into which the magnetic field sensors extend are each arranged radially with respect to a notional central axis that runs through the center of the circle of the circular path and perpendicularly to the chip plane. The magnetic field sensors are connected to a scanning device in such a way that measurement signals of the individual magnetic field sensors can be applied successively to a differential output terminal for a rotation scanning signal. The values of the magnetic field sensors are thus read on a cyclically rotating basis.

European Patent No. EP 2 149 797 (Micronas GmbH) discloses a device for the measurement of an angle at which a magnetic field is arranged in one plane. The device has at least two magnetic field sensors that are arranged with their measurement axes in and/or parallel to the plane and are oriented transversely to each other.

Metz et al. also describe the contactless measurement of a rotation angle in the publication "Contactless Angle Measurement Using Four Hall Devices on Single Chip," Transducers 1997, International Conference on Solid-State Sensors and Actuators, Chicago, 16-19 June 1997. This publication shows four lateral Hall sensors that are arranged at uniform distances from each other on a circular path located within a chip plane of the semiconductor substrate. A permanent magnet having two poles is applied at the end of a rotating axis and generates a magnetic field in the Hall sensors. The same device is described in European patent no. EP-B-0 916 074.

A sensor for detecting an angular orientation of a magnetic field of a magnet by means of the Hall effect is further disclosed in U.S. Patent Application Publication No. 2014/0 070 796 A1. A system for detecting the angular position of a rotating member with respect to a non-rotating member is known in U.S. Patent Application Publication No. 2009/0 219 016 A1.

The known devices have in common that a permanent magnet is mounted on a rotating element and generates a magnetic field detected by the Hall sensor, which supplies a measurement signal. There is a need to further develop signal processing methods of the supplied measurement signals in order to improve the precision of the measurement and to reduce the number of magnetic field sensors to a minimum.

SUMMARY OF THE INVENTION

A device for processing a measurement signal from a plurality of magnetic field sensors is disclosed in this description. This device comprises a permanent magnet, an odd number of magnetic field sensors that supply signal values of the measurement signals, wherein the odd number of magnetic field sensors is arranged in a plane below the permanent magnet having either two or four poles, and a signal processing unit. The signal processing unit is adapted to detect the signal values of the odd number of the magnetic field sensors to filter a frequency component of the fundamental wave (fundamental frequency) of the magnetic field out of the detected signal values and to calculate the value of a rotation angle of the permanent magnet.

In one aspect, the magnetic field sensors are Hall sensors. These magnetic field sensors can determine the value of a rotation angle from the filtered fundamental frequency.

In one aspect, the magnetic field sensors are lateral Hall sensors that are arranged preferably equiangularly in a circular path because this arrangement simplifies the calculation of the rotation angle. In principle, the magnetic field sensors (Hall sensors) could be arranged in different positions.

The spectral components are derived from the measurement signal via a transformation, e.g. a Fourier transformation.

In one aspect, the permanent magnet is rotatable about an axis of rotation, which is essentially vertical to the plane, and the axis of rotation runs essentially through the center of the circle.

A method for processing a measurement signal from a plurality of magnetic field sensors is also disclosed. The method comprises the following steps: Detection of the signal values of a magnetic field in at least three magnetic field sensors, which are permeated by the magnetic field, and filtering of a frequency component of the fundamental wave (fundamental frequency) of the magnetic field out of the measured signal values. The method can be used for the calculation of the rotation angle from the filtered frequency component.

BRIEF DESCRIPTION OF THE DRAWINGS

To better illustrate the invention, several exemplary embodiments are explained next on the basis of the following Figures, wherein the invention is not limited to these exemplary embodiments and aspects of one embodiment can be combined with aspects of another embodiment. The Figures show.

DETAILED DESCRIPTION

Figure 1:
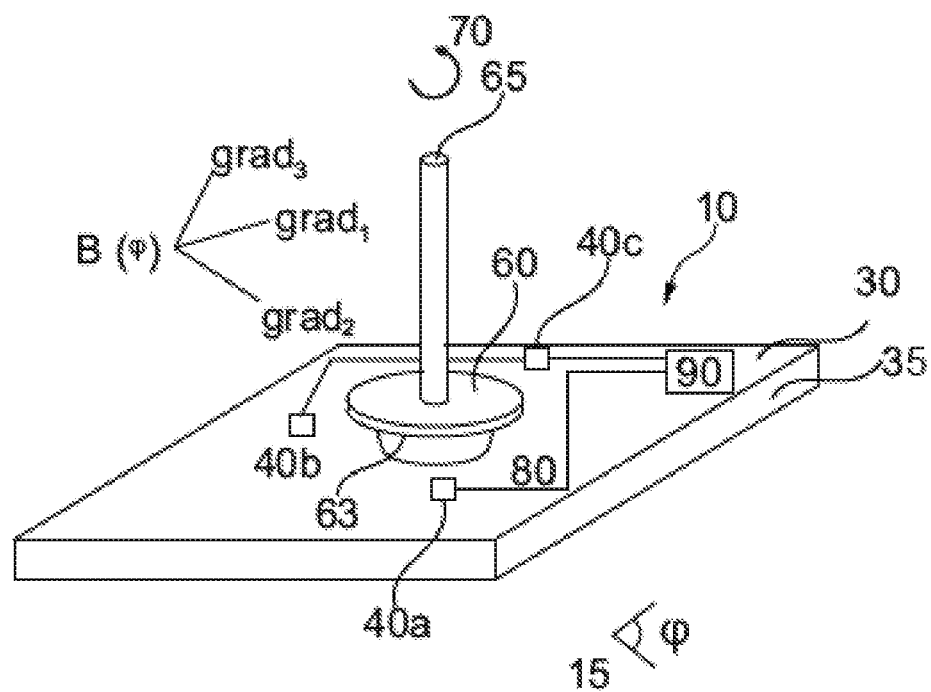
FIG. 1 an overview Figure of an exemplary embodiment of the device for performing the method.

FIG. 1 shows an overview of the device in a first non-limiting aspect of the invention. In this aspect, the device 10 has a magnet 60, e.g., a permanent magnet, which is placed at the front 63 of an axis 65 and generates a magnetic field $B(\varphi)$. The axis 65 rotates about an axis of rotation 70, and the device 10 can measure a rotation angle $\varphi$ 15 of the axis 65.

Figure 2:
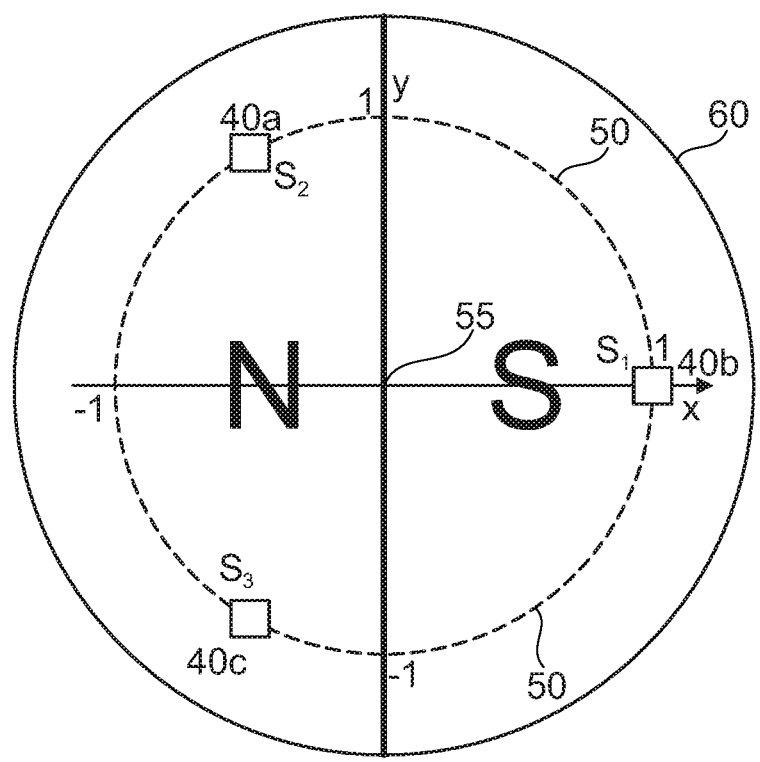
FIG. 2 a top view of the magnetic field sensors on a chip plane.

In this exemplary aspect, three magnetic field sensors, e.g., lateral Hall sensors 40a-40c, are placed on a semiconductor substrate (chip) 35 in a circular path 50. These magnetic field sensors 40a-c are depicted in FIG. 2 with the circular path 50 in a top view. The circular path 50 is located in a chip plane 30 below the magnet 60. The axis of rotation 70 of the axis 65 runs through the center of the circle 55 of the circular path 50 and is arranged essentially orthogonally with respect to chip plane 30 and, thus, also orthogonally with respect to the surface of the semiconductor substrate 35. The magnetic field sensors 40a-40c are connected to a signal processing unit 90 via wires 80. The signal processing unit 90 accepts the signal values $V_{S1}$, $V_{S2}$, $V_{S3}$, from the magnetic field sensors 40a-40c and calculates from said signal values the value of the rotation angle 15.

Figure 3:
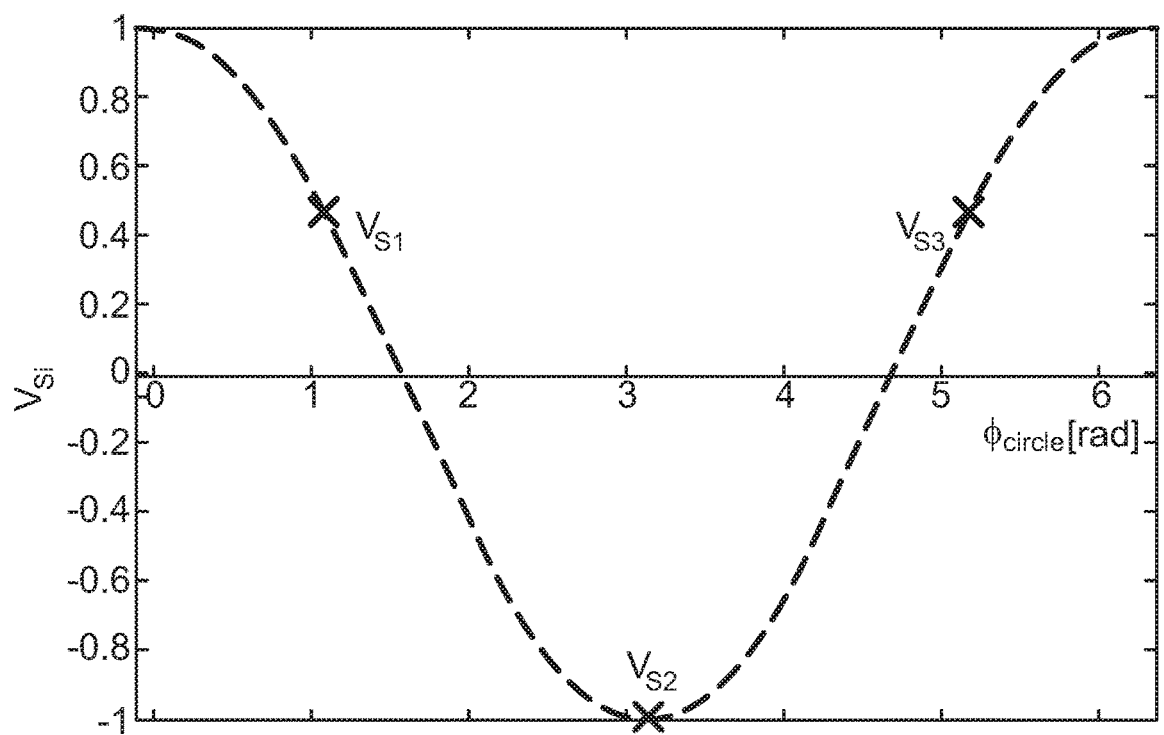
FIG. 3 measurement signals of the magnetic field sensors.

FIG. 2 shows that the three lateral Hall sensors 40a-f are arranged essentially equiangularly in the circular path 50. The permanent magnet 60 in this Figure is two-poled. In principle, the permanent magnet 60 can also have additional poles. The permanent magnet 60 shows the magnetic measurement angle 15 $\varphi$ and has a flux density $B_0$. Because of the respective angular displacement, the signal values of the measurement signals $V_{s1}$, $V_{s2}$, $V_{s3}$ of the three lateral Hall sensors 40a-c are phase-shifted by $\pm 2\pi/3$ on the circular path 50 and depicted idealized in FIG. 3. In the illustration in FIG. 3, it is assumed that the permanent magnet 60 generates an ideal field.

In this idealized aspect, the detected signal values of the magnetic field of the permanent magnet 60 form a sine curve over the entire circular path 50 that is detected at three positions of the three lateral Hall sensors 40a-c. In other words, the frequency of the depicted curve corresponds to the fundamental frequency $f_1$.

Figure 4:
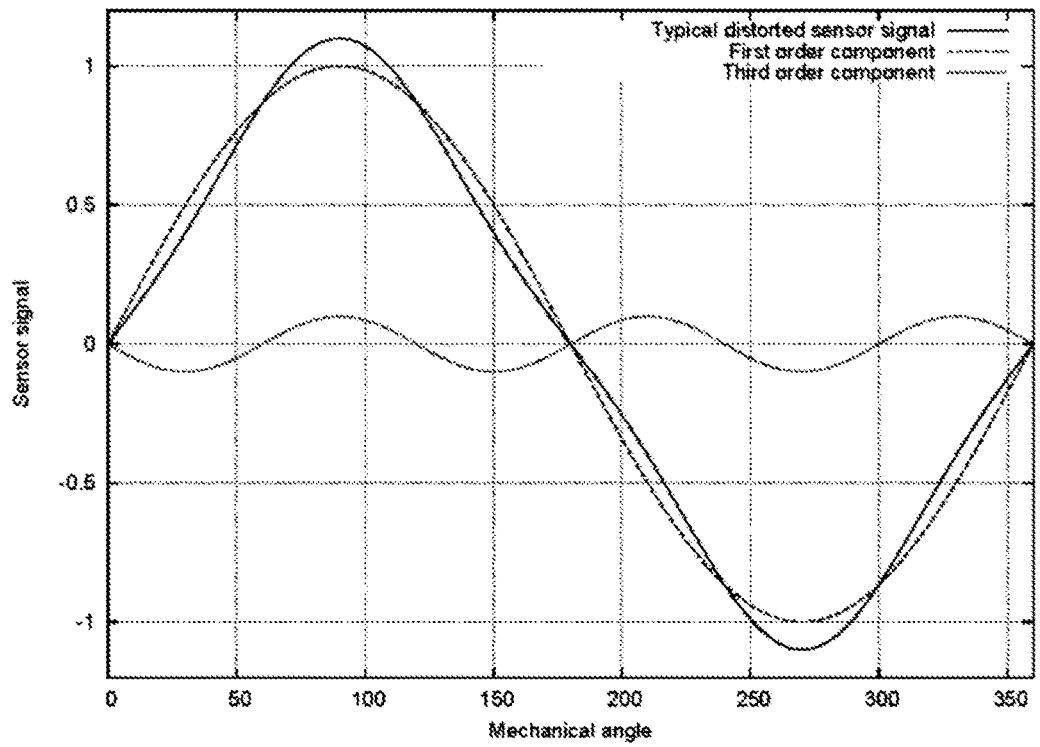
FIG. 4 a distorted measurement signal.

It is known that real magnets do not create a purely sinusoidal magnetic field along the circular path 15; rather, there are distortions as shown in a simplified manner in FIG. 4. This sensor signal shown in FIG. 4 can be broken down into a fundamental wave and a plurality of harmonic waves. FIG. 4 shows the breakdown into the fundamental wave and the third harmonic wave. In practice, the third harmonic wave is the most pronounced of all harmonic waves.

Figure 5:
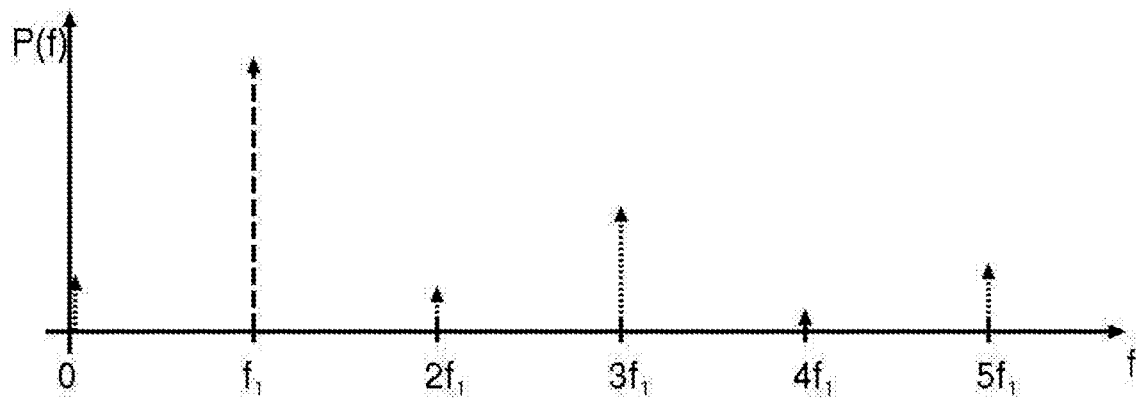
FIG. 5 a spectral illustration of the frequencies of the measurement signal.

Via a transformation, e.g. a Fourier transformation, a spectral representation of the component parts of the detected magnetic field $B(\varphi)$ can be produced that is depicted in FIG. 5. The intensity of each particular frequency component can be recognized in FIG. 5. The fundamental wave of the magnet signal appears as a spectral line at frequency $f_1$ (the fundamental frequency) and the 3rd harmonic wave as a line at $3f_1$.

Figure 8:
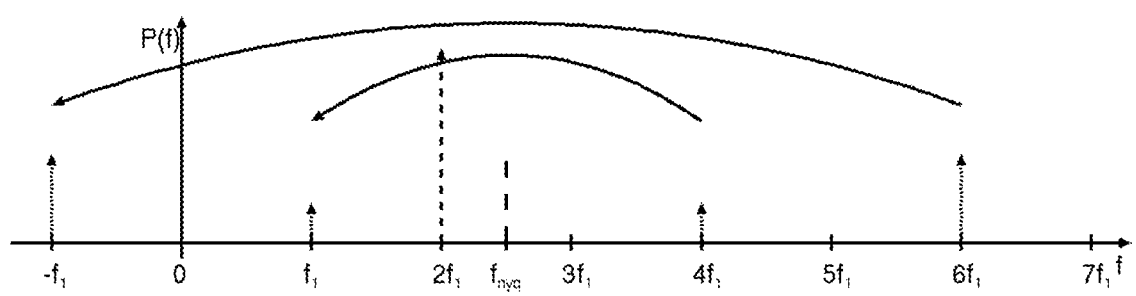

As detailed above, the magnetic field $B(\varphi)$ is scanned by the Hall sensors 40a-c. It is known that, in the scanning of a signal at discrete points, frequencies are demodulated via the so-called Nyquist frequency $f_{nyq}$. For example, if in FIG. 8 the magnetic field $B(\varphi)$ is to be scanned with four Hall sensors at four equidistant positions on the circular path 50 (i.e. sampling frequency $f_s=4\ f_1$), then frequencies are demodulated in this aspect via the Nyquist frequency $f_{nyq}=2\ f_1$. This demodulation is shown in FIG. 8. In a similar manner, the Nyquist frequency is calculated to be $f_{nyq}=1.5\ f_1$ when scanning with the three Hall sensors 40a-c in FIG. 2 (sampling frequency $f_s=3f_1$).

Figure 6:
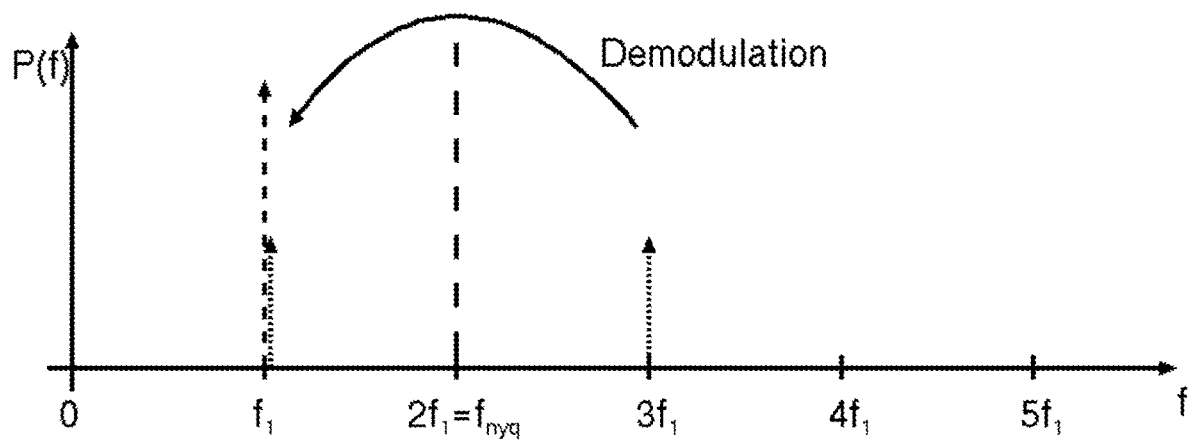
FIGS. 6-8 further spectral illustrations of the frequencies.

From FIG. 6 (four magnetic field sensors) it is evident that the third harmonic wave at $3\ f_1$ has been aliased down to the fundamental wave at the fundamental frequency $f_1$. Likewise, the fifth harmonic wave $5f_1$ is aliased to $-f_1$, wherein $-f_1$ is not distinguishable from $f_1$. After the demodulation of a harmonic wave to the fundamental wave, the harmonic waves can no longer be distinguished from the fundamental wave. Thus, unavoidable angle errors would arise in such a calculation of the angle 15.

A solution to this problem consists of using a greater number of magnetic field sensors 40. The sampling frequency $f_s$ would be higher in this case, and, therefore, only even higher odd harmonic waves would be demodulated to the fundamental wave $f_1$. These higher harmonic waves generally have a weaker value and can be disregarded. However, a higher number of the magnetic field sensors 40 would have the disadvantage that the computational effort increases.

Figure 7:
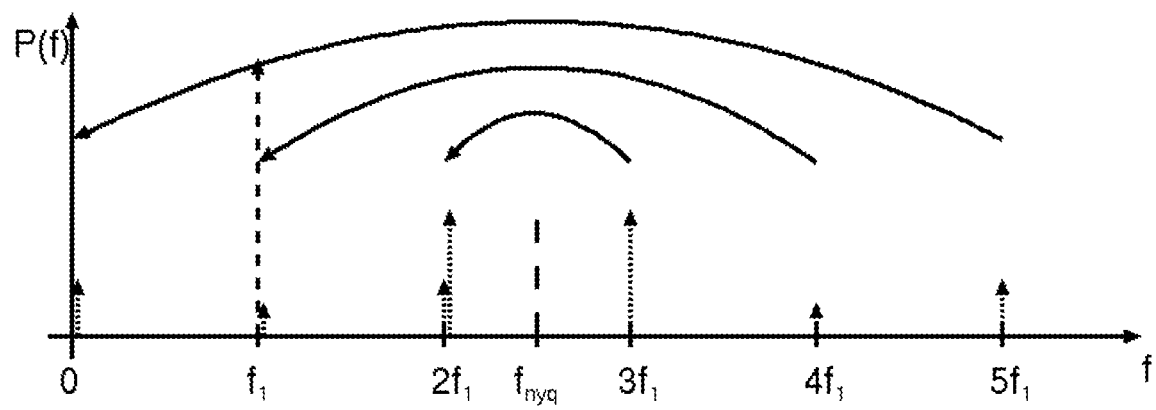

A further solution is provided by the use of an odd number of magnetic field sensors 40. FIG. 7 shows, for example, the demodulation with a quantity of five Hall sensors 40 on the circular path 50. FIG. 7 shows that only the fourth harmonic wave at $4f_1$ drops to the fundamental wave $f_1$ and the sixth harmonic wave at $6f_1$ drops to $-f_1$. None of the odd harmonic waves drops to the fundamental wave when an odd number of Hall sensors 40 is used.

Generally speaking, the values of the odd harmonic waves are more strongly pronounced than the even harmonic waves. Such odd harmonic waves consequently cause the largest errors during the angle calculation, and it is advantageous when these odd harmonic waves are not demodulated to the fundamental wave. As previously stated, the strength of the signal drops for higher harmonic waves. A demodulation of the fourth harmonic wave to the fundamental wave consequently results in less pronounced angle errors.

A combination of a four-pole permanent magnet 60 with five Hall sensors is shown in FIG. 8. The harmonic waves of the four-pole permanent magnets 60 are at $4f_1$, $6f_1$, etc., and the fundamental wave is at $2f_1$. Located at the odd-numbered frequencies are gaps in the frequency spectrum. In the case of a simple demodulation, the frequency $3f_1$ (not present) would drop to the fundamental wave at $2f_1$ and the frequency $7f_1$ (also not present) to $-2f_1$. Only after a two-fold demodulation does $f_8$ drop to $-2f_1$. However, this is not shown in FIG. 8.

In the case of a four-pole permanent magnets 60, five is the lowest number of Hall sensors on the circular path 50 without the odd harmonic waves being demodulated to the fundamental wave. In the case of an even number of Hall sensors, ten Hall sensors would be required to alias $8f_1$ to $2f_1$. However, this would represent double the computing effort.

In principle, in the case of an odd number of magnetic field sensors 40, all even frequencies drop during a simple demodulation to odd frequencies. Such odd frequencies do not distort the angle calculation. Only after a two-fold demodulation do even frequencies drop to even frequencies.

For the determination of the magnet angle 15, only the fundamental wave with the fundamental frequency $f_1$ of the magnetic field generated by the magnet 60 has to be considered. The remaining components of the spectrum, which are between 0 and $f_s/2$ after scanning, must be suppressed by filtering. This filtering can be accomplished via a Kalman filter, a PLL or a correlation analysis. The phase information of the fundamental wave in this process supplies the magnet angle 15 via an arc tangent calculation.

In the described system, an odd number of magnetic field sensors 40 functions with any magnet 60 having an arbitrary number of poles, because the number of poles is always even. In the case of an even number of Hall sensors 40, the number of poles must not be identical to the number of Hall sensors 40. Thus, in the case of a six-pole permanent magnet, five magnetic field sensors may be used, but not six Hall sensors.

It is also known that the positioning of the magnet 60 opposite the sensor chip with the magnetic field sensors 40 also causes harmonic waves (see FIG. 7). The system described herein also eliminates the effects of an incorrect positioning. A sensor noise is also reduced during the spectral filtering of the signals, because higher frequencies are likewise suppressed.

Figure 9:
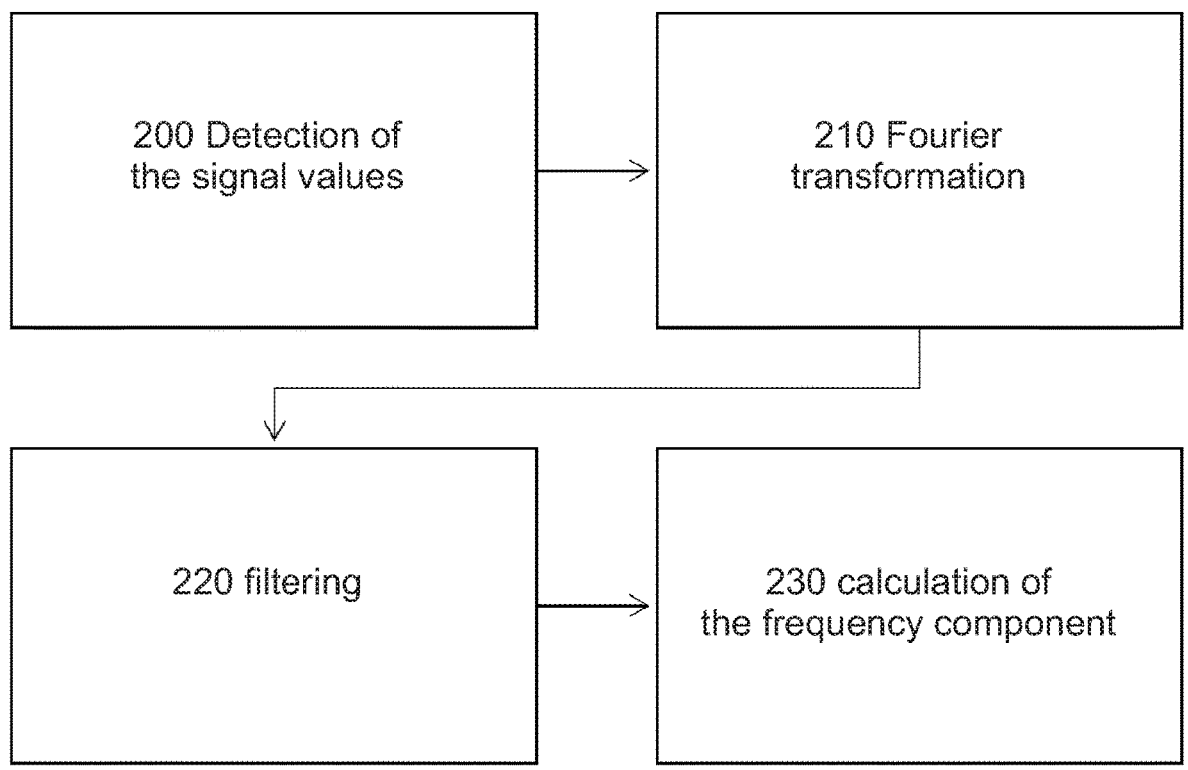
FIG. 9 the sequence of the method.

The sequence of the method is illustrated in FIG. 9. In a first step 200, the signal values of the magnetic field are detected by the magnetic field sensors 40 and stored in memory when applicable. In the next step 210, the frequency component of the detected signal values is calculated by a transformation. The unnecessary frequency components are filtered out in a further step 220, and in step 230 the angle 15 is calculated from the real and imaginary parts of the signal values by an arc tangent calculation.

LIST OF REFERENCE NUMBERS

10 Device
15 Rotation angle
30 Chip plane
35 Semiconductor substrate
40a-f First lateral Hall sensors
50 Circular path
55 Center of the circle
60 Magnet
65 Axis
70 Axis of rotation
75 Interfering conductor
80 Wires
90 Signal processing unit

What is claimed is:

1. A device for the processing of a measurement signal of a magnetic field $B(\varphi)$ comprising:
    an odd number of magnetic field sensors, wherein the odd number of magnetic field sensors is at least five, that are arranged in a plane below a permanent magnet having two or four poles, wherein the magnet generates the magnetic field; and
    a signal processing unit that is adapted to detect the signal values of the at least five magnetic field sensors to filter a fundamental frequency of the magnetic field out of the detected signal values and to calculate the value of a rotation angle of the permanent magnet.

2. The device according to claim 1, wherein the odd number of the magnetic field sensors are Hall sensors.

3. The device according to claim 1, wherein the odd number of the magnetic field sensors is arranged in a circular path.

4. The device according to claim 3, wherein the magnet is rotatable about an axis of rotation which is perpendicular to the plane, and the axis of rotation runs essentially through the center of the circle of the circular path.

5. A method for processing a measurement signal of a magnetic field comprising the following steps:
    creation of the magnetic field $B(\varphi)$;
        detection of the signal values of the created magnetic field in at least five magnetic field sensors;
        filtering of a fundamental frequency out of a frequency spectrum of the signal values; and
        calculating a rotation angle from the filtered fundamental frequency.

* * * * *